US008982739B2

(12) United States Patent
Kim et al.

(10) Patent No.: US 8,982,739 B2
(45) Date of Patent: Mar. 17, 2015

(54) MOBILE TERMINAL AND METHOD OF CONTROLLING THE SAME

(75) Inventors: Yong Kim, Seoul (KR); Suyoung Lee, Seoul (KR); Yusol Ha, Seoul (KR); Sunhee Cheon, Seoul (KR); Jihye Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 13/323,665

(22) Filed: Dec. 12, 2011

(65) Prior Publication Data

US 2013/0044648 A1   Feb. 21, 2013

(30) Foreign Application Priority Data

Aug. 18, 2011 (KR) .................. 10-2011-0082154

(51) Int. Cl.
*H04Q 11/00* (2006.01)
*H04M 1/253* (2006.01)
*H04M 1/725* (2006.01)

(52) U.S. Cl.
CPC ........ *H04M 1/2535* (2013.01); *H04M 1/72522* (2013.01)
USPC ........... 370/271; 370/352; 370/356; 370/270; 370/255; 370/254; 455/344; 455/425

(58) Field of Classification Search
CPC .......... H05K 11/00; H04B 1/08; H04B 1/086; H04B 1/088; H04M 1/2535; H04M 1/72522; H04M 1/24; A42B 3/30; A04W 24/00; H04W 24/00
USPC .................. 370/270, 352–356; 455/344, 425
See application file for complete search history.

(56) References Cited

U.S. PATENT DOCUMENTS

| 8,089,943 | B2 * | 1/2012 | Lim .............................. 370/338 |
| 2004/0259544 | A1 | 12/2004 | Amos | |
| 2005/0243979 | A1 | 11/2005 | Starbuck et al. | |

(Continued)

FOREIGN PATENT DOCUMENTS

| CN | 1612565 | 5/2005 |
| CN | 1826792 | 8/2006 |

(Continued)

OTHER PUBLICATIONS

European Patent Office Application Serial No. 11190619.4, Search Report dated Jan. 7, 2013, 6 pages.

(Continued)

*Primary Examiner* — Khaled Kassim
(74) *Attorney, Agent, or Firm* — Lee, Hong, Degerman, Kang & Waimey

(57) ABSTRACT

A mobile terminal and a method of controlling the mobile terminal are provided. The mobile terminal includes: a display; a wireless Internet module; and a controller for acquiring information about a plurality of voice over Internet protocol (VoIP) accounts that can communicate through the wireless Internet module and for distinguishing information about a first user group corresponding to the acquired plurality of VoIP accounts from information about a second user group not corresponding to the acquired plurality of VoIP accounts and for displaying the information in the display. Therefore, by displaying to distinguish information about a user group corresponding to a plurality of VoIP accounts from other information, a function can be easily selected through a plurality of VoIP accounts.

14 Claims, 20 Drawing Sheets

(56) References Cited

U.S. PATENT DOCUMENTS

| | | | |
|---|---|---|---|
| 2007/0280452 A1* | 12/2007 | Bernard | 379/201.01 |
| 2008/0045176 A1* | 2/2008 | Ho et al. | 455/344 |
| 2008/0076409 A1* | 3/2008 | Hinrikus et al. | 455/425 |
| 2008/0182563 A1* | 7/2008 | Wugofski et al. | 455/414.2 |
| 2009/0147771 A1* | 6/2009 | Seal et al. | 370/352 |
| 2009/0150346 A1* | 6/2009 | Soderstrom | 707/3 |
| 2010/0287256 A1* | 11/2010 | Neilio | 709/217 |
| 2011/0029923 A1* | 2/2011 | Xu et al. | 715/825 |
| 2011/0078184 A1* | 3/2011 | Song et al. | 707/770 |
| 2011/0299471 A1* | 12/2011 | Wang | 370/328 |
| 2012/0124203 A1* | 5/2012 | Richards | 709/224 |
| 2012/0129572 A1* | 5/2012 | Johnstone et al. | 455/552.1 |
| 2012/0163574 A1* | 6/2012 | Gundotra et al. | 379/114.03 |
| 2012/0198348 A1* | 8/2012 | Park | 715/739 |
| 2012/0250841 A1* | 10/2012 | Drake et al. | 379/93.01 |
| 2012/0259791 A1* | 10/2012 | Zoidze | 705/319 |
| 2013/0029701 A1* | 1/2013 | Cabos | 455/466 |

FOREIGN PATENT DOCUMENTS

| | | |
|---|---|---|
| CN | 102137202 | 7/2011 |
| EP | 1253796 | 10/2002 |

OTHER PUBLICATIONS

The State Intellectual Property Office of the People's Republic of China Application Serial No. 201110390430.5, Office Action dated Jan. 24, 2014, 7 pages.

* cited by examiner (a)

(b)

(c)

(d)

(a)

(b)

(c)

(d)

(a)  (b)

(a)

(b)

(a)

(b)

(c)

(a)

(b)

(c)

(a)

(b)

(a)

(b)

(a)

(b)

(c)

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2011-0082154, filed on Aug. 18, 2011, the contents of which are hereby incorporated by reference herein in its entirety.

FIELD OF THE INVENTION

The present invention relates to a mobile terminal and a method of controlling the same, and more particularly, to a mobile terminal and a method of controlling the same that can easily select a function through a plurality of VoIP accounts by displaying to distinguish a user group's information corresponding to the plurality of VoIP accounts from other information.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

An aspect of the present invention is to provide a mobile terminal and a method of controlling the same that can easily select a function through a plurality of VoIP accounts by displaying to distinguish a user group's information corresponding to the plurality of VoIP accounts from other information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
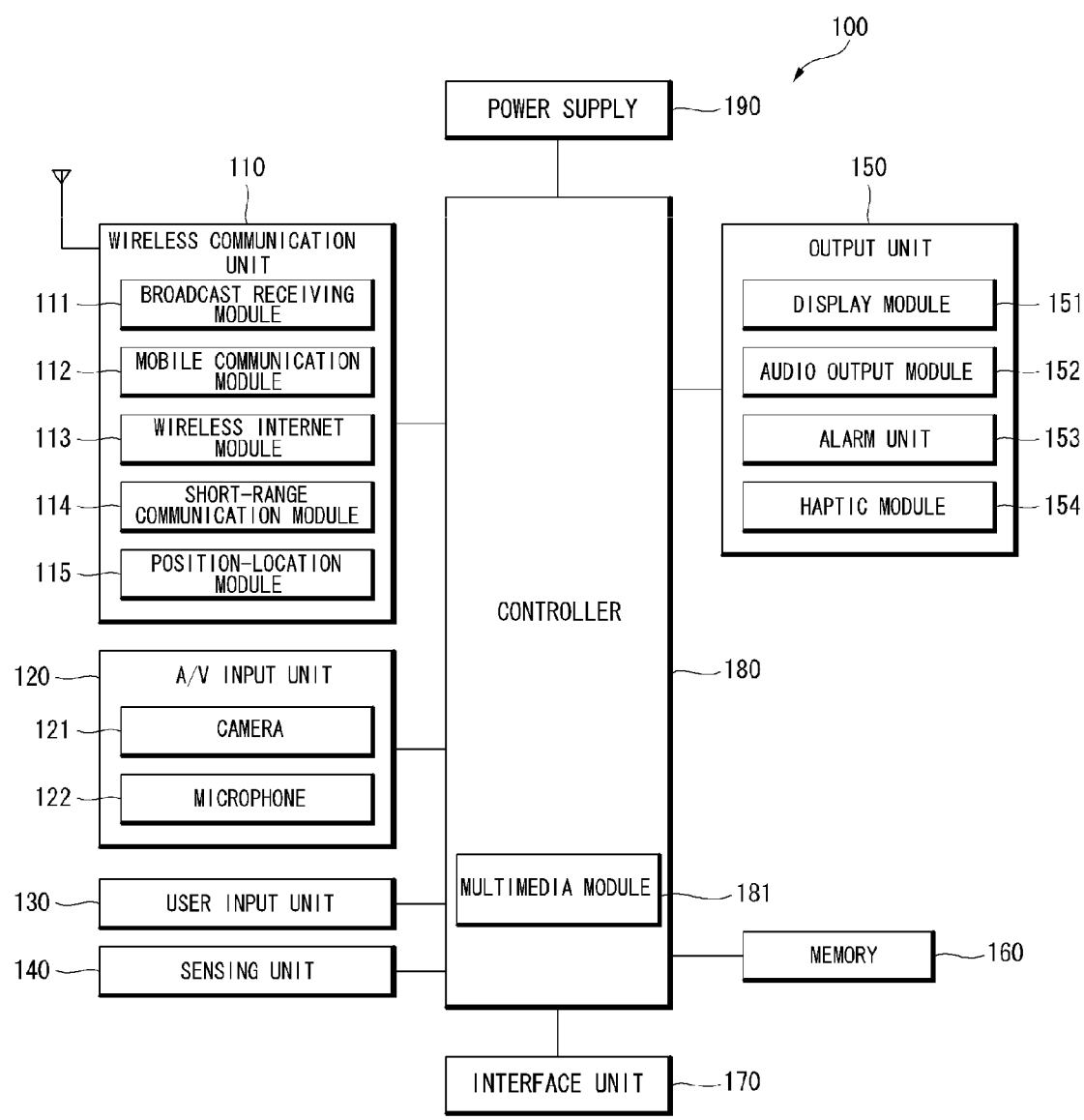
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
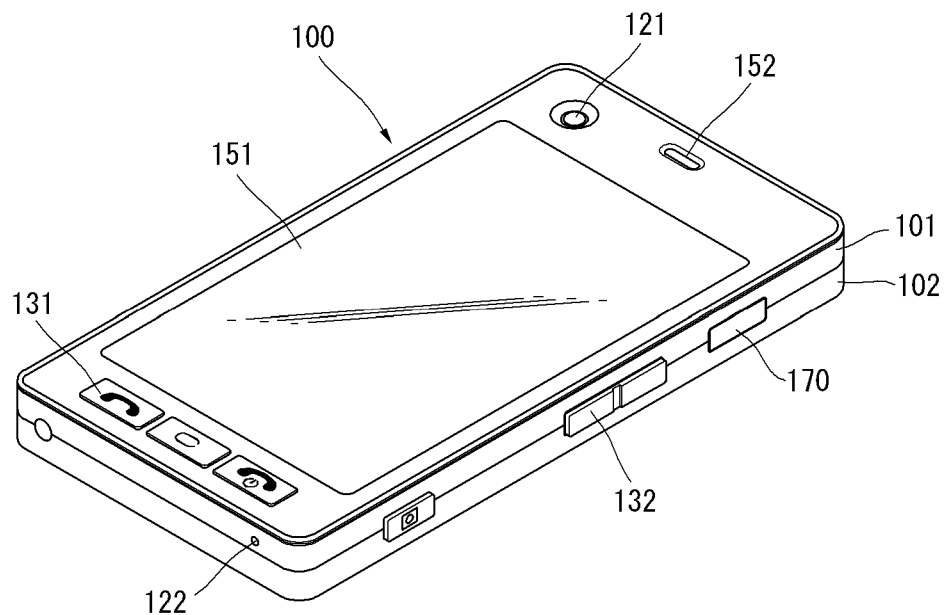
FIG. 2A is a front perspective view of the mobile terminal according to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
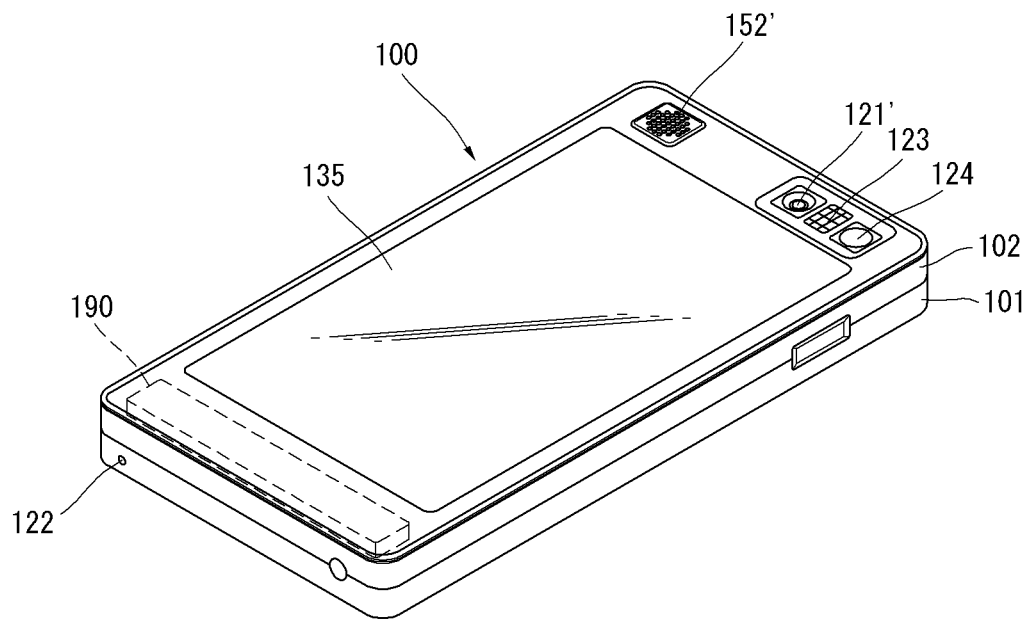
FIG. 2B is a rear perspective view of the mobile terminal according to an embodiment of the present invention.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 2C:
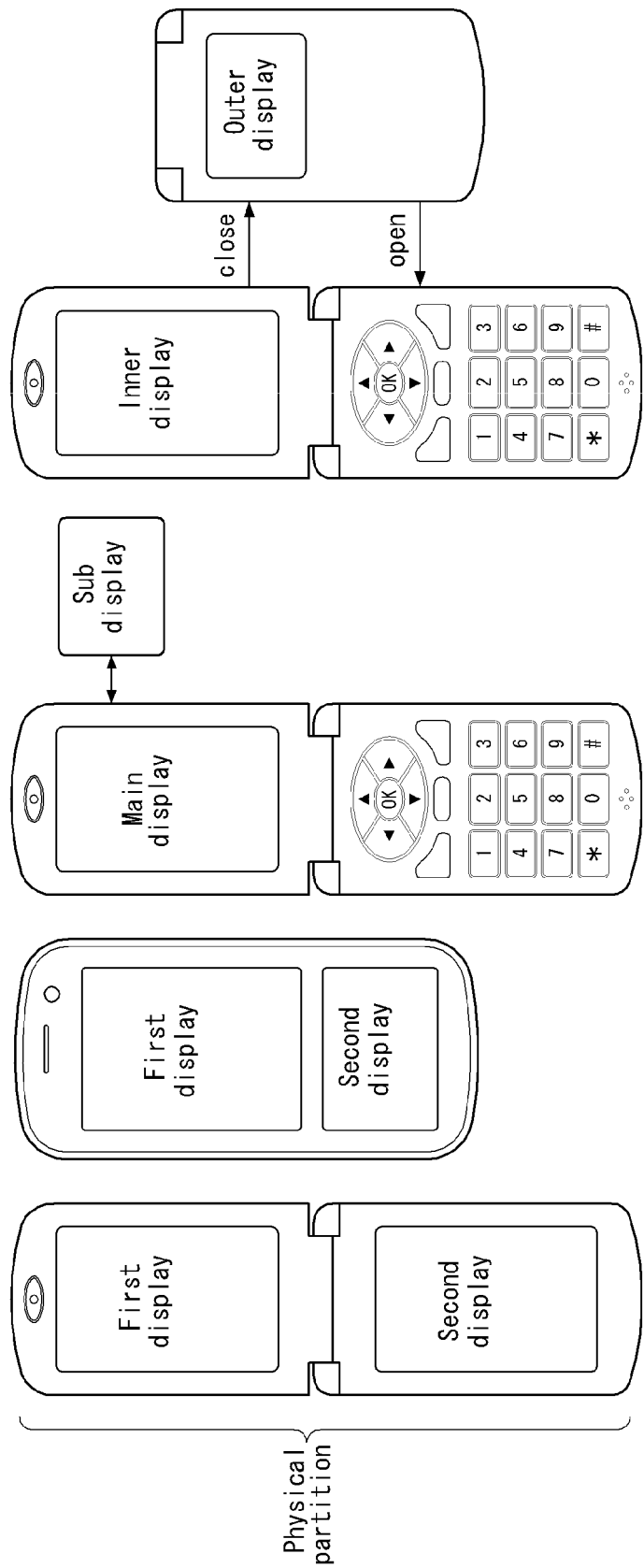
FIGS. 2C and 2D illustrate forms of the mobile terminal and display screens according to various embodiments of the present invention.
Figure 2D:
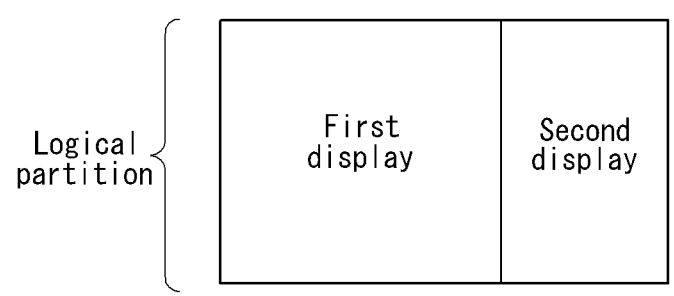

FIGS. 2C and 2D illustrate the mobile terminal 100 and the display unit 151 according to various embodiments of the present invention.

Referring to FIG. 2C, the display unit 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display unit 151 can include first and second displays which are logically separated from each other in a display panel, as illustrated in FIG. 2D.

Figure 3:
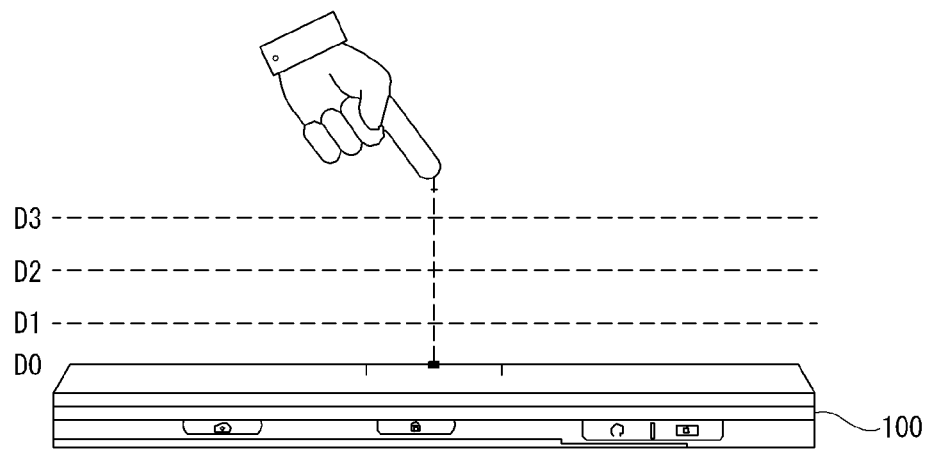
FIG. 3 is a conceptual view for explaining a proximity depth of a proximity sensor.

FIG. 3 is a conceptual view for explaining a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
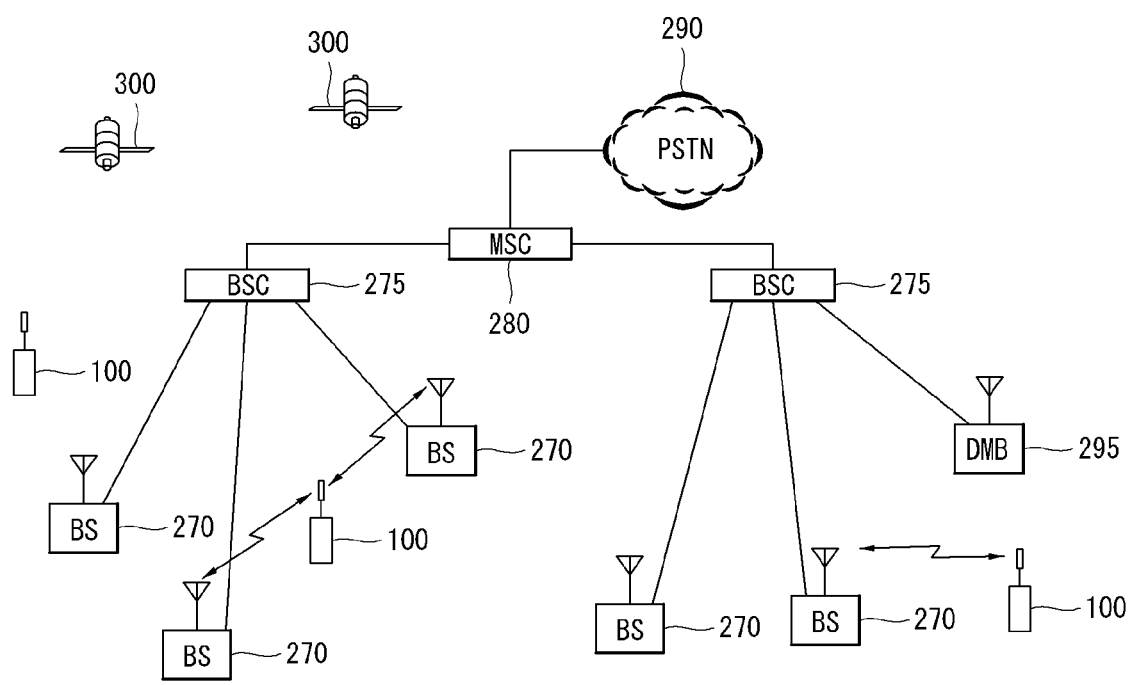
FIG. 4 illustrates a configuration of a CDMA wireless communication system communicating with the mobile terminal shown in FIG. 1.

Referring to FIG. 4, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the mobile terminals 100 operating in the CDMA wireless communication system. The broadcasting receiving module 111 of each mobile terminal 100 is constructed to receive the broadcasting signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the mobile terminals 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 5:
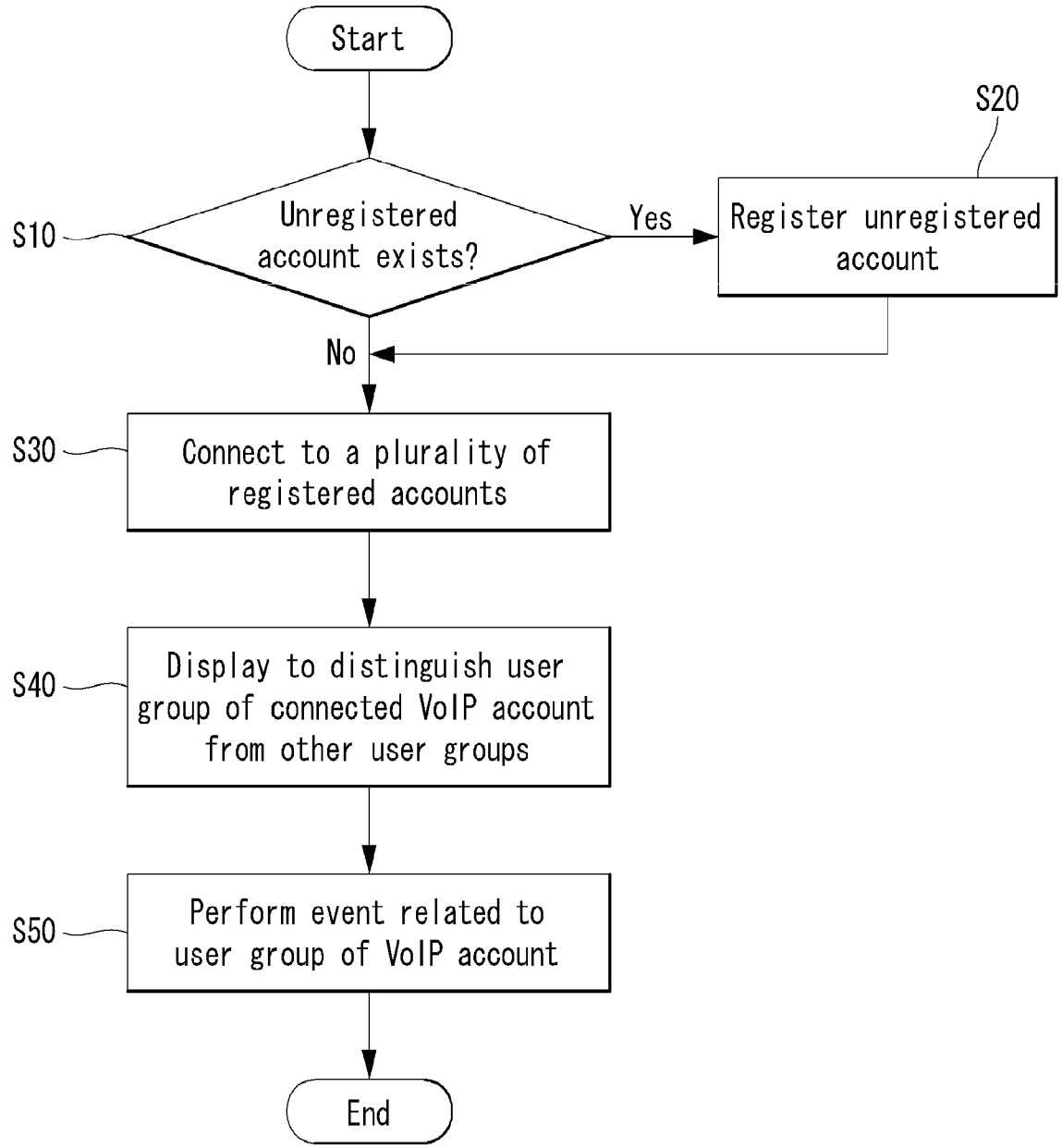
FIG. 5 is a flowchart illustrating operation of a mobile terminal according to an embodiment of the present invention.

FIG. 5 is a flowchart illustrating operation of a mobile terminal according to an embodiment of the present invention.

As shown in FIG. 5, the controller 180 of the mobile terminal 100 according to an embodiment of the present invention determines whether an unregistered account exists (S10).

An account may be an account of a voice over Internet protocol (VoIP) service. The VoIP may be a service that can perform communication using an Internet network. For example, the VoIP may be a communication service that can perform communication through a general phone network by converting in voice data to Internet protocol data packet. A protocol used for a VoIP service may be H.323, SIP, MGCP, and MEGACO.

A plurality of accounts may exist. That is, a specific user may join in a plurality of VoIP services. A kind or a cost of a service may be changed according to a provider that provides a VoIP service. For example, a first VoIP service may provide free of charge voice communication and message transmission, and a second VoIP service may provide free of charge only voice communication. Further, a voice communication quality of the second VoIP service may be more excellent than that of the first VoIP service. Therefore, a user can join in a plurality of VoIP services in order to use an appropriate VoIP service according to a situation.

In VoIP accounts of a user of the mobile terminal 100, it is determined whether an unregistered account exists in the mobile terminal 100. That is, it is determined whether an account that is not stored exists in the mobile terminal 100 among a plurality of VoIP accounts in which the user joins.

The controller 180 determines whether an unregistered account exists based on user information of the mobile terminal 100. For example, the controller 180 determines whether an unregistered account exists by connecting to each VoIP service based on information such as a user's name and birthdate.

It may be determined whether an unregistered account exists through directly inputting specific account information of the user. For example, the user may select a specific VoIP service and input ID and/or a password of the VoIP service.

If an unregistered account exists, an unregistered account is registered (S20).

Registration to an unregistered account is performed by a control operation of the controller 180 and/or an input action of a user.

If an unregistered account does not exist, the controller 180 connects to a plurality of registered accounts (S30).

Connection to a registered account is performed by inputting ID and/or a password of the account. ID of the account may sometimes be a phone number of the mobile terminal 100.

Connection to a registered account can be substantially simultaneously performed at a plurality of accounts. For example, it may be simultaneously connected to first to third VoIP services at a specific time point.

By simultaneously connecting to a plurality of accounts, a message acquired through a corresponding VoIP service may be notified to a user. Therefore, inconvenience in which the user checks a message by connecting to each of a plurality of VoIP services can be removed.

The controller 180 controls to display to distinguish a user group of the connected VoIP account from other user groups (S40).

When the VoIP service is used, a service may be used free of charge, as described above. Therefore, when the same function is used, it may be preferred to transmit and receive a message through a VoIP service using the wireless Internet module 113 rather than to communicate using the mobile communication module 112.

A user may sometimes not prefer communication through a VoIP service. For example, a message transmitted using a VoIP service may be not normally transmitted, or a quality of communication using a VoIP service may be deteriorated. In consideration of such a situation, a specific user may not want to use communication through a VoIP service. Furthermore, due to such a reason, the user may not want to use a specific VoIP service.

A function of performing communication using a VoIP service can display to distinguish a user group of a connected VoIP account from other user groups in consideration of a user's preference. For example, information about a first user group that can transmit a message using a VoIP service may be displayed to distinguish from information about a second user group that can transmit a message through a method other than a VoIP service.

The controller 180 performs an event related to a user group of a VoIP account (S50).

Various events related to a user group of a VoIP account may exist. For example, an account that provides a VoIP service may be related to execution of a function of transmitting a message to other users related to the account. An event will be described in detail in a related portion.

Figure 6:
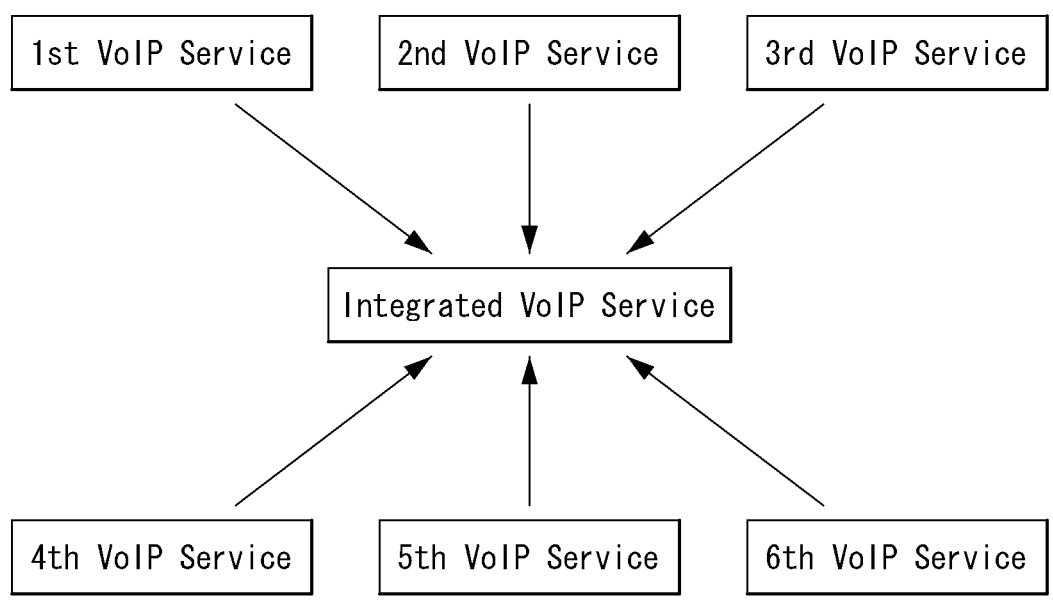
FIG. 6 is a diagram illustrating operation of the mobile terminal of FIG. 5.

FIG. 6 is a diagram illustrating operation of the mobile terminal of FIG. 5.

As shown in FIG. 6, the controller 180 of the mobile terminal 100 according to an embodiment of the present invention integrates and manages accounts related to a plurality of VoIP services into one account.

First to sixth VoIP services may exist. Conventionally, a separate application should be used for each VoIP service. For example, in order to access a first VoIP service, a first application should be used, and in order to access a second VoIP service, a second application should be used.

The controller 180 integrally manages a VoIP service that can access by using each application. That is, related data can be exchanged by logging in a corresponding account with information about an account of a VoIP service. Therefore, inconvenience that transmits a message by logging in a separate VoIP service can be removed.

Figure 7:
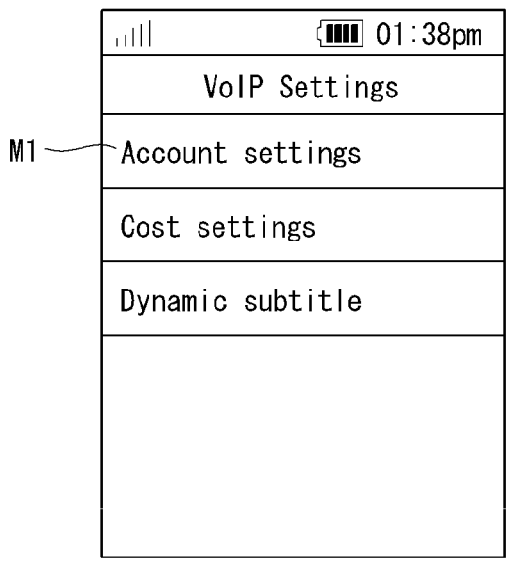
FIGS. 7(a)-(d) and 8 are diagrams illustrating a process of integrating an account of the mobile terminal of FIG. 5.
Figure 7:
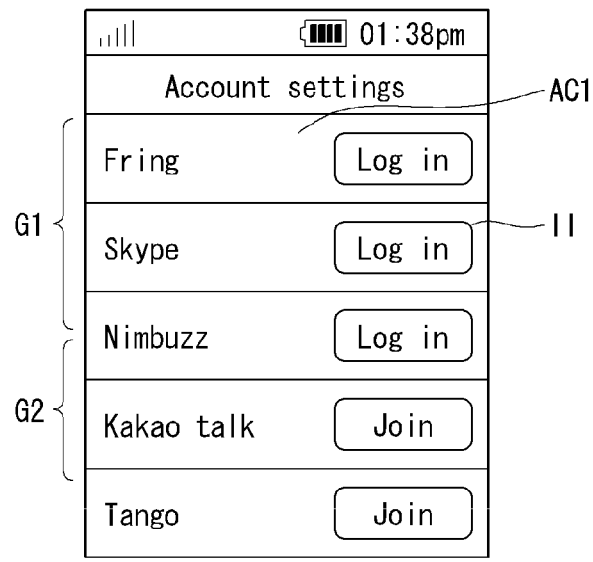
Figure 7:
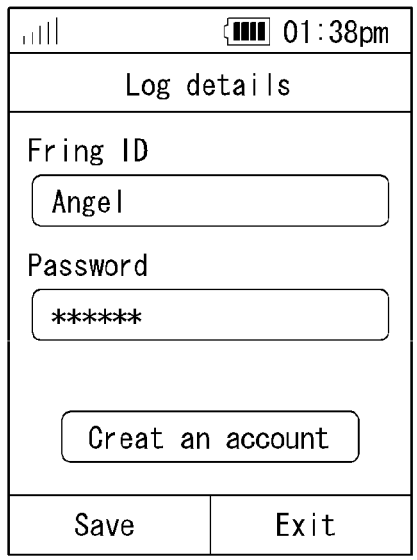
Figure 7:
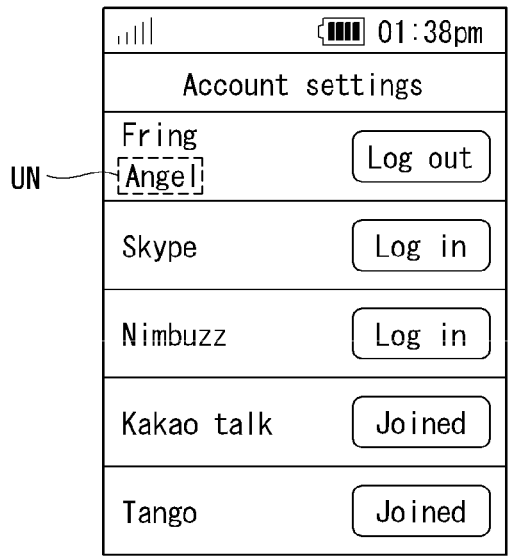
Figure 8:
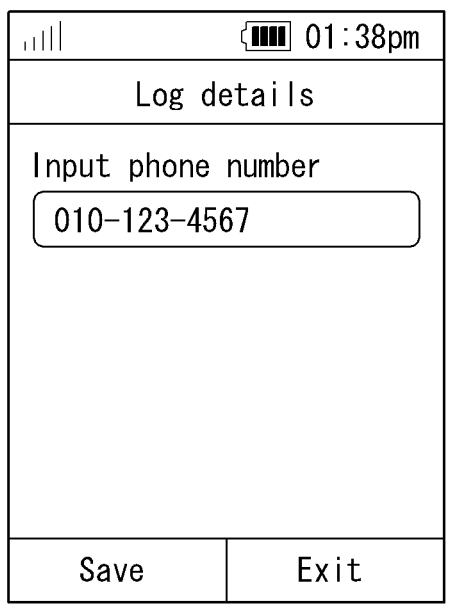

FIGS. 7 and 8 are diagrams illustrating a process of integrating an account of the mobile terminal of FIG. 5.

As shown in FIGS. 7 and 8, the controller 180 of the mobile terminal 100 according to an embodiment of the present invention can register an account of a VoIP service in which a user joins and log in at a registered account.

As shown in FIG. 7A, a screen for setting information about an account in which the user joins is displayed in the display 151.

As shown in FIG. 7B, the controller 180 controls to display information about a VoIP service related account in which the user joins.

Information about a VoIP service related account may differently represent a first account G1 that can log in with ID and a second account G2 that can log in with a phone number.

Display of the first and second accounts G1 and G2 may be distinguished by an account identification mark II. For example, an account identification mark II of log in' may be displayed in the first account G1, and an account identification mark II of 'join' may be displayed in the second account G2. The user can easily recognize a log-in method of the account with only viewing an account identification mark II.

As shown in FIG. 7C, by selecting a Fring VoIP account AC1, which is one of the first accounts G1, information of the account may be input. As described above, because the first account G1 is an account that can input using a user's ID, the user inputs ID and/or a password.

As shown in FIG. 7D, when the user inputs information about an account, account information UN is displayed in the display 151.

The account information UN may be ID or a chat name of the user in a corresponding VoIP service. That is, in order for the user to easily identify a corresponding account, related information may be displayed in the display 151.

As shown in FIG. 8, in the second account G2, a data input action that can join in a VoIP account is performed through an action in which the user inputs a phone number. An input of ID, a password and/or a phone number by the user is performed only one time when an unregistered account exists. That is, input information is stored in the memory 160 and thus it is unnecessary to repeatedly perform the same action.

Figure 9:
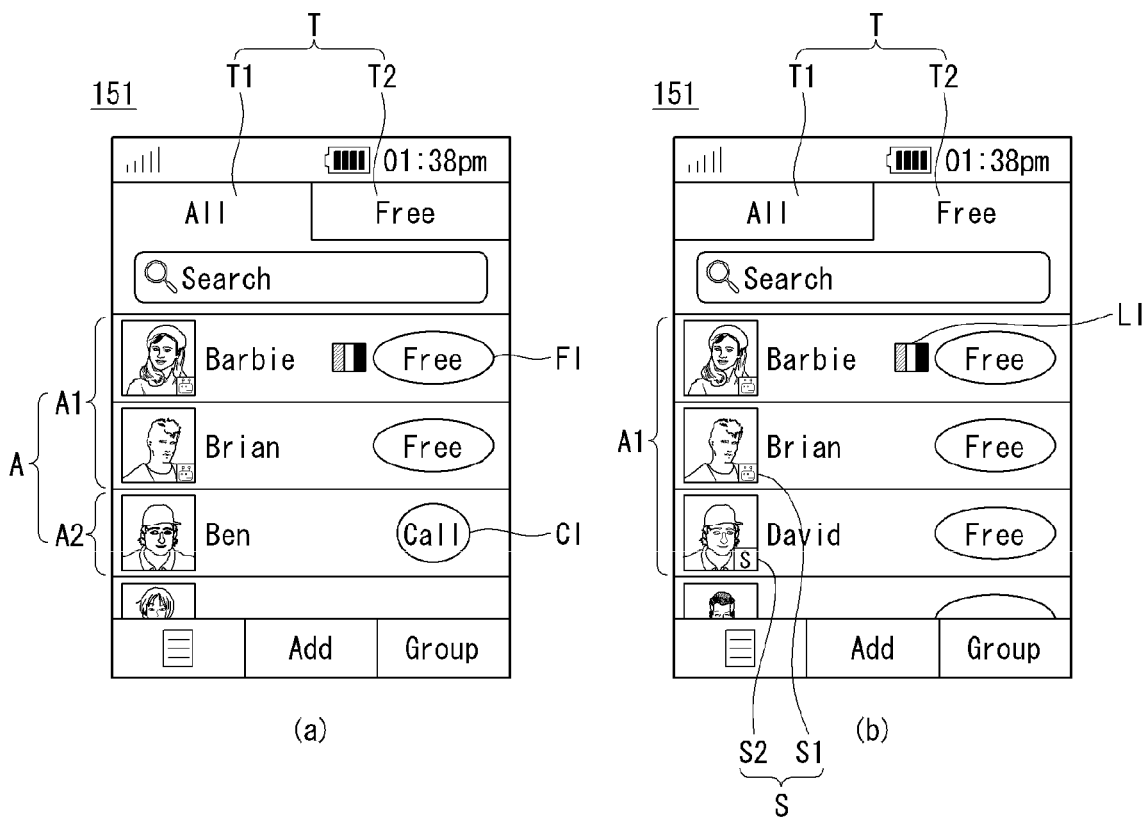
FIGS. 9(a)-(b) are diagrams illustrating a screen for displaying to distinguish a user group in the mobile terminal of FIG. 5.

FIG. 9 is a diagram illustrating a screen for displaying to distinguish a user group in the mobile terminal of FIG. 5.

As shown in FIG. 9, the controller 180 of the mobile terminal 100 according to an embodiment of the present invention controls to display to distinguish a first user group A1 and a second user group A2 corresponding to a VoIP account.

As shown in FIG. 9A, first and second tabs T1 and T2 may be displayed in the display 151.

The first tab T1 may be a tap T for comprehensively displaying information of other users stored in the mobile terminal 100 and that can allow to exchange a message. When a user selects the first tab T1, the controller 180 controls to display both user information that can communicate through a VoIP service and user information that can communicate through the mobile communication module 112.

Even when the first tab T1 is selected, the controller 180 controls to display to distinguish the first user group A1 using a VoIP service and the second user group A2 that does not use a VoIP service. For example, a free icon FI may be displayed at a position corresponding to a user belonging to the first user group A1, and a pay icon CI may be displayed at a position corresponding to a user belonging to the second user group A2.

The free icon FI may be an icon representing that a cost is not charged when transmitting a message and/or an icon to the user. The pay icon CI may be an icon representing that a cost is charged when transmitting a message and/or a call to the user.

The user can easily recognize whether a cost is charged for communication with another user with only viewing a displayed icon. Furthermore, it is necessary for the user to know only that a cost is not charged for communication with another user, and it is unnecessary to consider that which VoIP service should be used. For example, in a case where a cost is charged when using the first VoIP service and a cost is free when using the second VoIP service, the controller 180 controls to perform communication with another user using the second VoIP service.

As shown in FIG. 9B, the user can select the second tab T2. When the second tab T2 is selected, the controller 180 controls to display user information that can transmit and receive free of charge a message and/or a call using a VoIP service. That is, other user information related to a previously input plurality of VoIP services may be displayed in the display 151.

By displaying only information about users belonging to the first user group A1, other users using a VoIP service can be easily selected.

Information about users belonging to the first user group A1 includes position information LI and service information S.

The position information LI may be an icon representing information about a present position of a specific user belonging to the first user group A1. The position information LI is based on GPS information that acquires from the user's terminal. When the position information LI is acquired, the controller 180 controls to display the user's position with a national flag of a nation corresponding to the position.

The service information S may be an icon representing that communication can be performed when which user uses which VoIP service. The service information S may be representative icons S1 and S2 representing a corresponding VoIP service. That is, when a kind of a VoIP service is changed, the representative icons S1 and S2 can be changed.

A plurality of service information S may be displayed. For example, when a specific user performs communication using first and second VoIP services, both an icon corresponding to the first VoIP service and an icon corresponding to the second VoIP service may be displayed.

Figure 10:
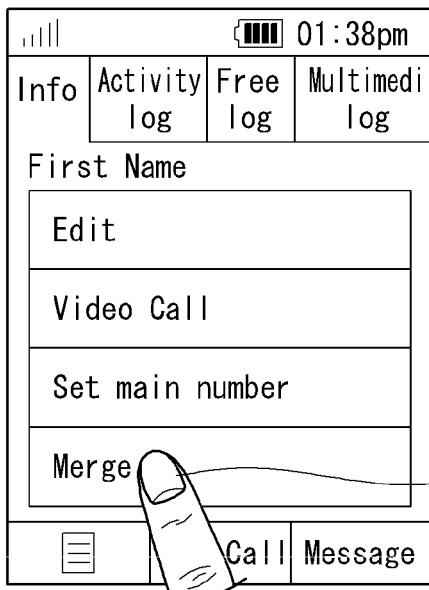
FIGS. 10(a)-(d) are diagrams illustrating a process of integrating a user account in the mobile terminal of FIG. 5.
Figure 10:
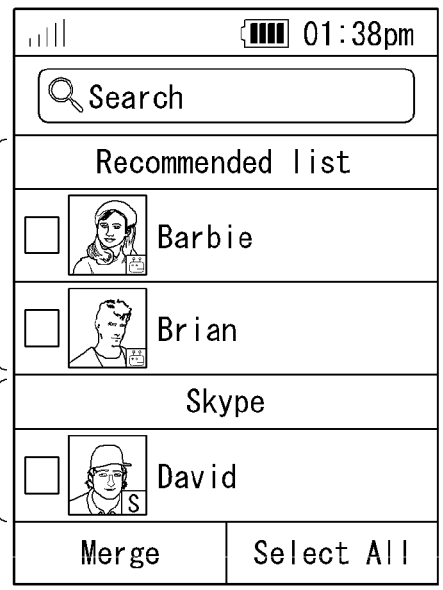
Figure 10:
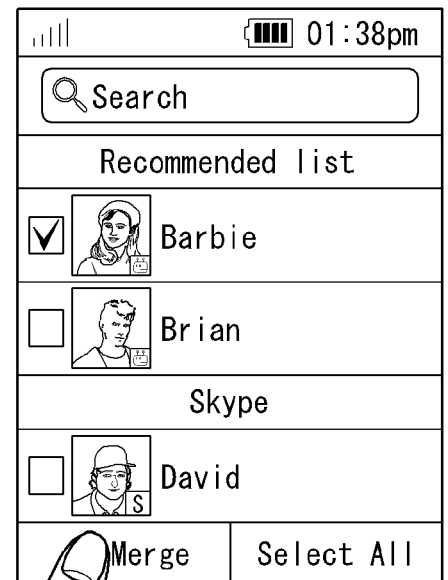
Figure 10:
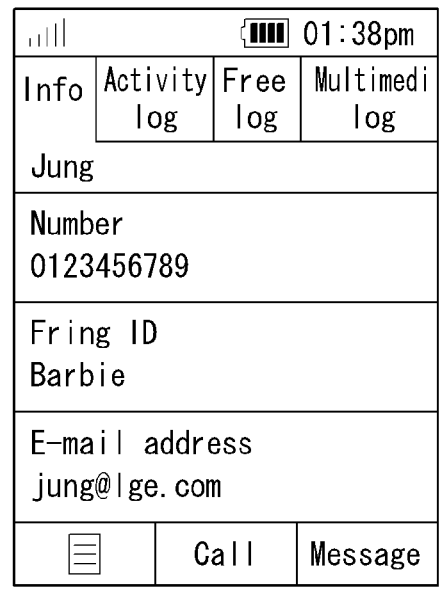

FIG. 10 is a diagram illustrating a process of integrating a user account in the mobile terminal of FIG. 5.

As shown in FIG. 10, the controller 180 of the mobile terminal 100 according to an embodiment of the present invention performs operation of searching for and/or adding a VoIP service in which a specific user uses based on information of the specific user.

As shown in FIG. 10A, the user can select a merge function. The merge function may be a function of searching for and/or adding a VoIP service in which a specific user joins.

As shown in FIG. 10B, when the merge function is executed, the controller 180 controls to display a recommendation list A3 and/or a service list A4.

The recommendation list A3 displays information related to the user found by a search operation of the controller 180. For example, when information related to Barbie and Brian is found, the user may be displayed in the recommendation list A3.

The service list A4 may be a portion that displays to distinguish other users on a specific VoIP service basis. For example, the user who can communicate through a skype service, which is one of VoIP services may be displayed under a title 'skype'.

As shown in FIG. 10C, the user can select another user Barbie and then select a merge menu.

As shown in FIG. 10D, found information of a selected specific user may be shown in the display 151. When the displayed information corresponds to Barbie's information, the user can add the displayed information as Barbie's information. Search of information about a specific user can be performed based on previously input information of the user. For example, search of information about a specific user may be performed based on known information among a name, phone number, and ID of the specific user.

Figure 11:
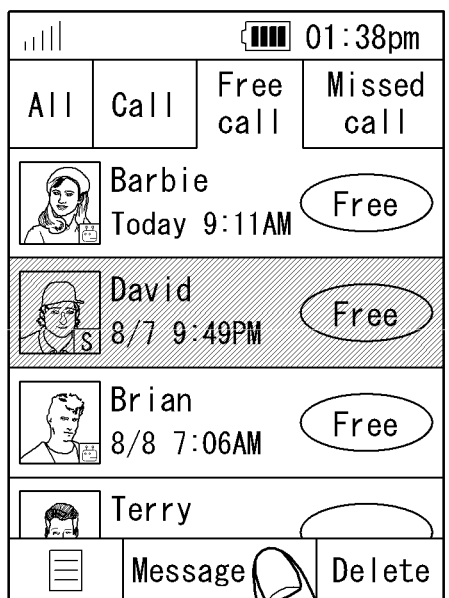
FIGS. 11(a)-(b) and 12 are diagrams illustrating a process of transmitting a message to another party using the mobile terminal of FIG. 5.
Figure 11:
Figure 11:
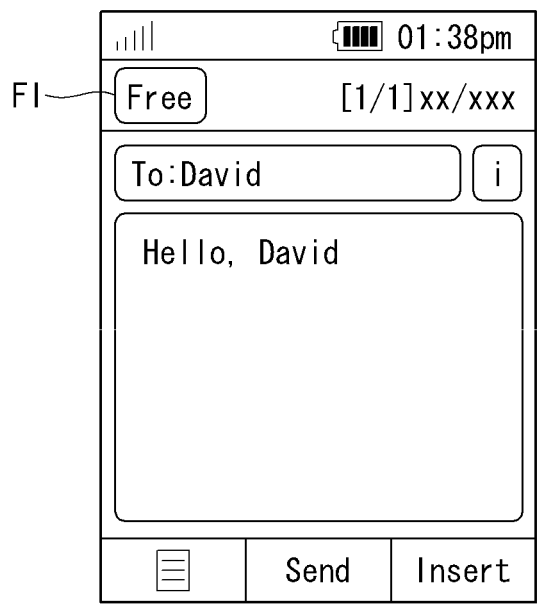
Figure 12:
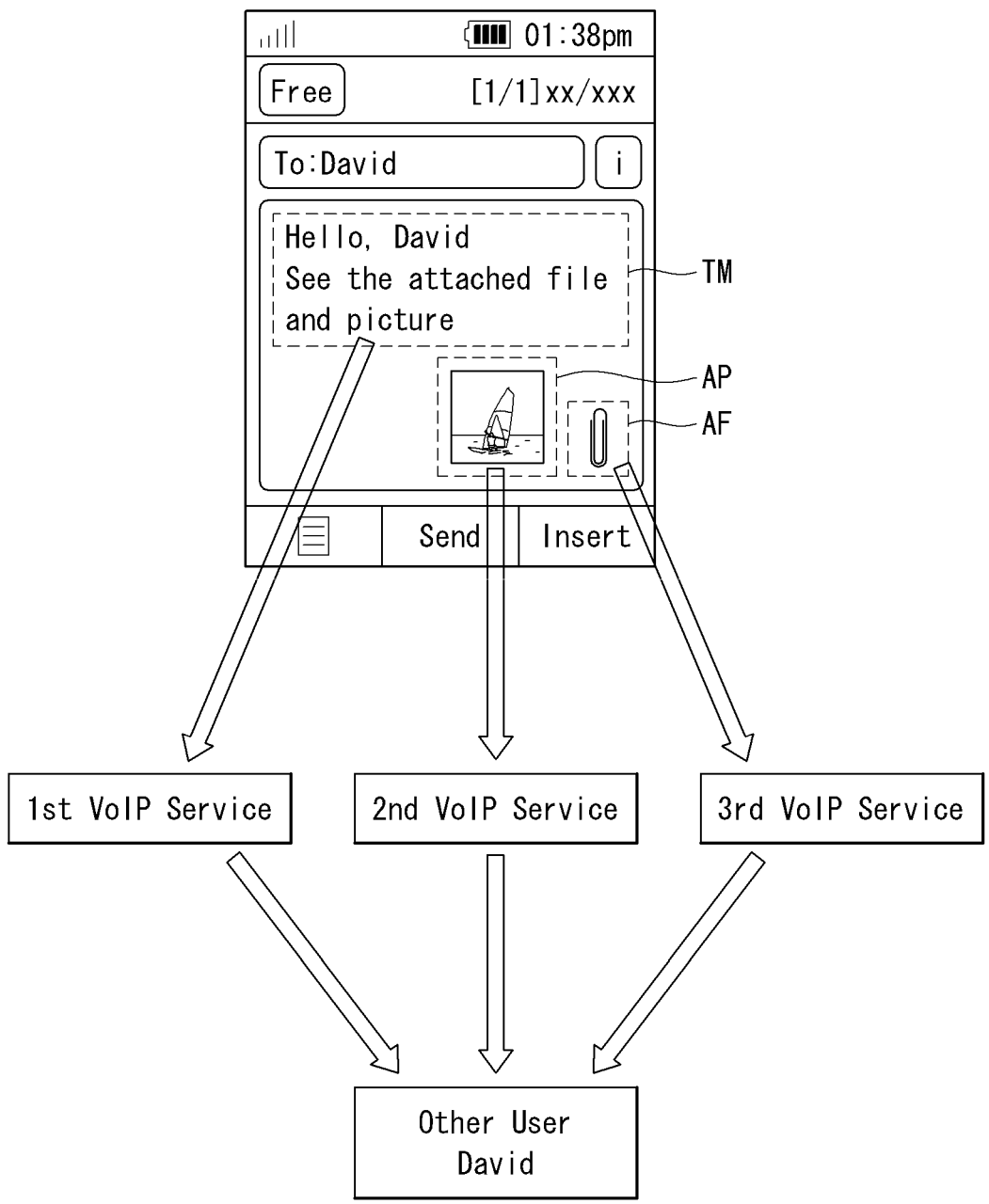

FIGS. 11 and 12 are diagrams illustrating a process of transmitting a message to another user using the mobile terminal of FIG. 5.

As shown in FIG. 11A, the user can select a function of selecting a specific user and transmitting a message.

As shown in FIG. 11B, when a specific user selected by the user performs communication through a VoIP service, a free icon FI may be displayed.

As shown in FIG. 12, a message in which the user transmits to the specific user may include at least one of a text message TM, a picture AP, and an attachment file AF.

A VoIP service that can be used for communication with a specific user may have different functions according to the kind. For example, in a first VoIP service, only a text message TM service may be free and a picture AP service or an attachment file AF service may be charged. In a second VoIP service, a picture AP service may be free, and in a third VoIP service, an attachment file AF service may be free.

The controller 180 divides and sends a message according to a characteristic of a VoIP service. That is, the controller 180 sends a text message TM through the first VoIP service, sends a picture AP through the second VoIP service, and sends an attachment file AF through the third VoIP service. Another user's terminal merges and displays separately sent messages.

Figure 13:
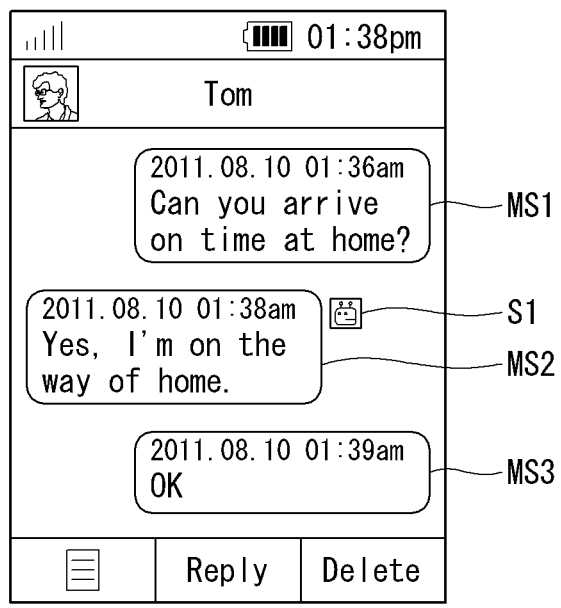
FIGS. 13(a)-(b) and 14(a)-(c) are diagrams illustrating a screen for displaying transmitted and received messages using the mobile terminal of FIG. 5.
Figure 13:
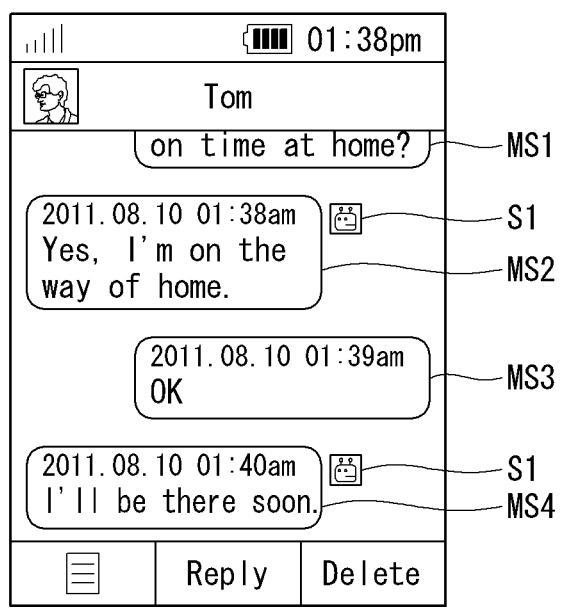
Figure 14:
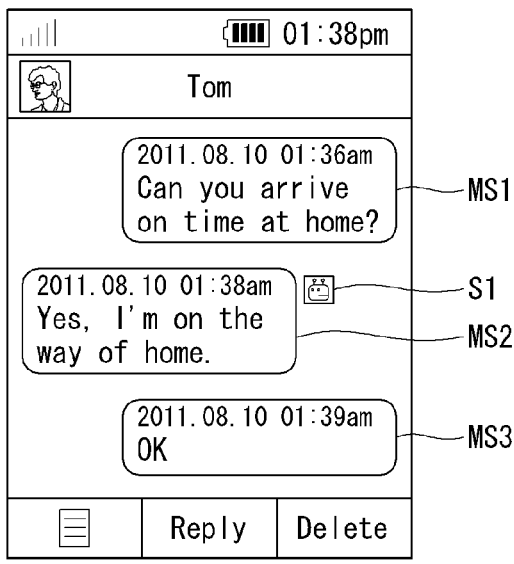
Figure 14:
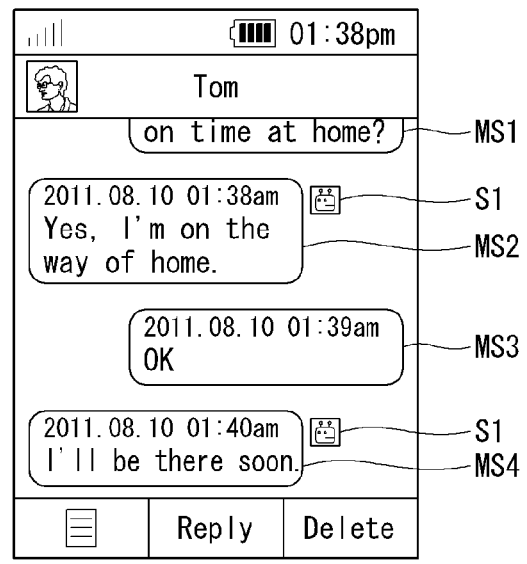
Figure 14:
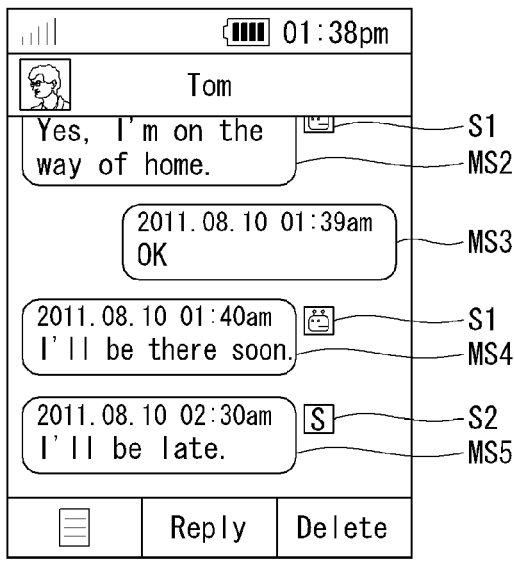

FIGS. 13 and 14 are diagrams illustrating a screen for displaying transmitted and received messages using the mobile terminal of FIG. 5.

As shown in FIGS. 13 and 14, the controller 180 of the mobile terminal 100 according to an embodiment of the present invention controls to add and display a kind of a VoIP service to a message received through the VoIP service.

As shown in FIGS. 13A and 13B, first and third messages MS1 and MS3 are messages in which the user of the mobile terminal 100 transmits to users of other terminals, and a second message MS2 is a message in which a user of another terminal transmits to the user of the mobile terminal 100.

The controller 180 controls to display representative icons S1 and S2 corresponding to a kind of a VoIP service that receives the message in the second message MS2 received from a user of another terminal. Therefore, the user can easily recognize that communication is performed with a specific user with which VoIP service.

As shown in FIGS. 14A and 14B, a representative icon S1 of a specific VoIP service may be displayed in second and fourth messages MS2 and MS4 received from a specify party, for example, "Tom." Furthermore, as shown in FIG. 14C, when a fifth message MS5 is received from the specify party through another VoIP service, the changed representative icon S2 may be added to the fifth message MS5. That is, a specific another user can transmit and receive a message through another VoIP service according to a situation.

Figure 15:
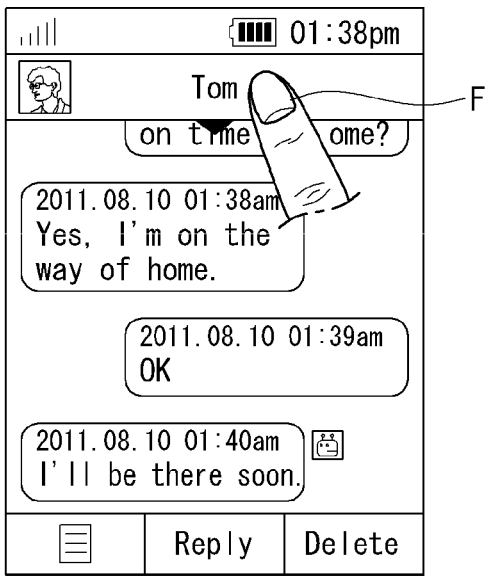
FIGS. 15(a)-(c) are diagrams illustrating a screen for displaying an attachment file of transmitted and received messages using the mobile terminal of FIG. 5.
Figure 15:
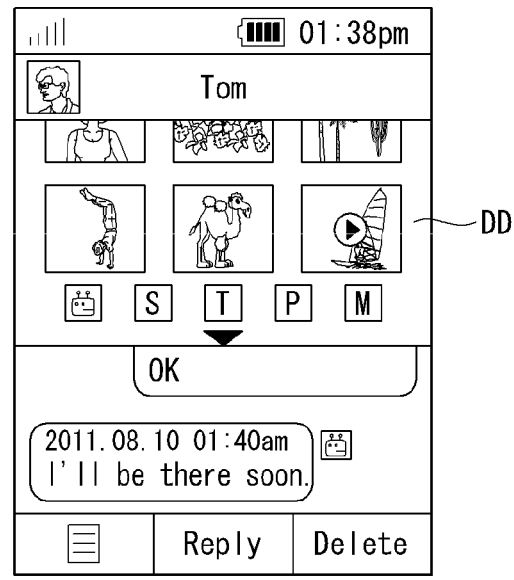
Figure 15:
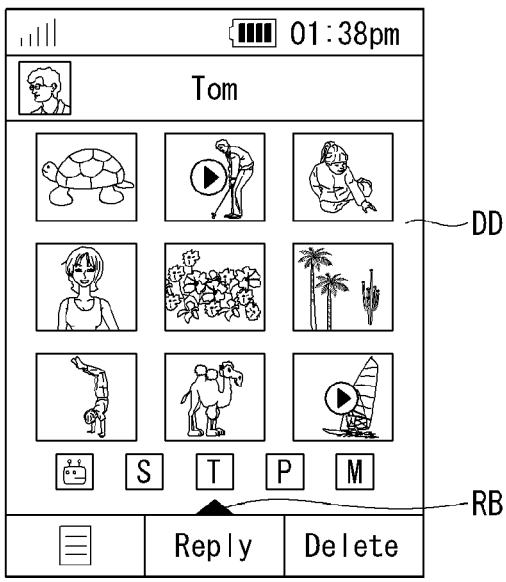

FIG. 15 is a diagram illustrating a screen for displaying an attachment file of transmitted and received messages using the mobile terminal of FIG. 5.

As shown in FIG. 15, the controller 180 of the mobile terminal 100 according to an embodiment of the present invention controls to display an image and an attachment file transmitted and received to and from other users.

As shown in FIG. 15A, the user can perform a touch action from the upside to the downside of the display 151 with a finger F.

As shown in FIG. 15B, a curtain type pop-up window DD may be displayed from the upside to the downside of the display 151 to correspond to the user's touch action. For example, a pop-up window DD of a form in which a window is gradually enlarged to the downside of the display 151 may be displayed.

As shown in FIG. 15C, an image transmitted and received to and from a specific user may be displayed in the pop-up window DD. Furthermore, a connection icon DCB corresponding to a VoIP service that can communicate with the specific user may be displayed in the pop-up window DD.

Figure 16:
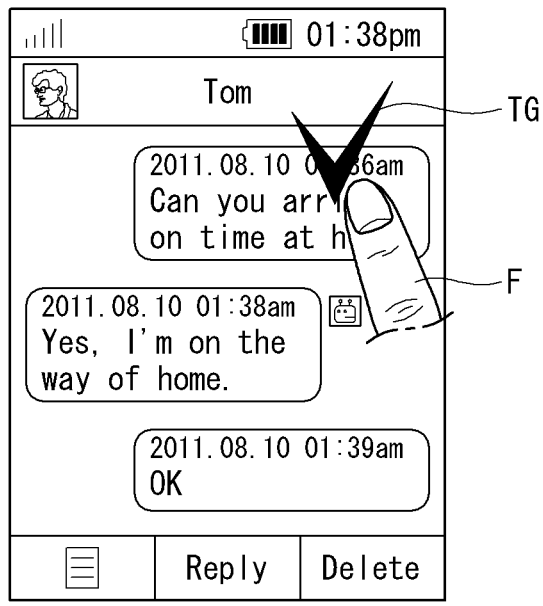
FIGS. 16(a)-(b) are diagrams illustrating a process of selecting a specific message from transmitted and received messages using the mobile terminal of FIG. 5.
Figure 16:
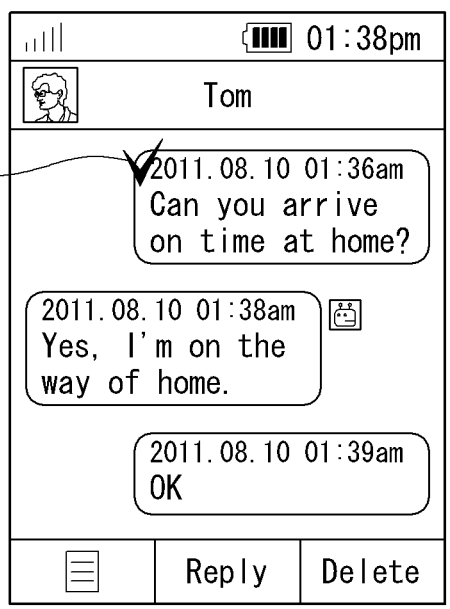

FIG. 16 is a diagram illustrating a process of selecting a specific message from transmitted and received messages using the mobile terminal of FIG. 5.

As shown in FIG. 16, the user can select a specific message wishing to store.

As shown in FIG. 16A, the user can perform a touch action TG of selecting a specific message using a finger F.

As shown in FIG. 16B, the controller 180 controls to display a selection icon CI to correspond to the user's touch action TG. The controller 180 controls to separately manage a message in which the selection icon CI is displayed, or to separately display only a selected message to correspond to a user manipulation.

Figure 17:
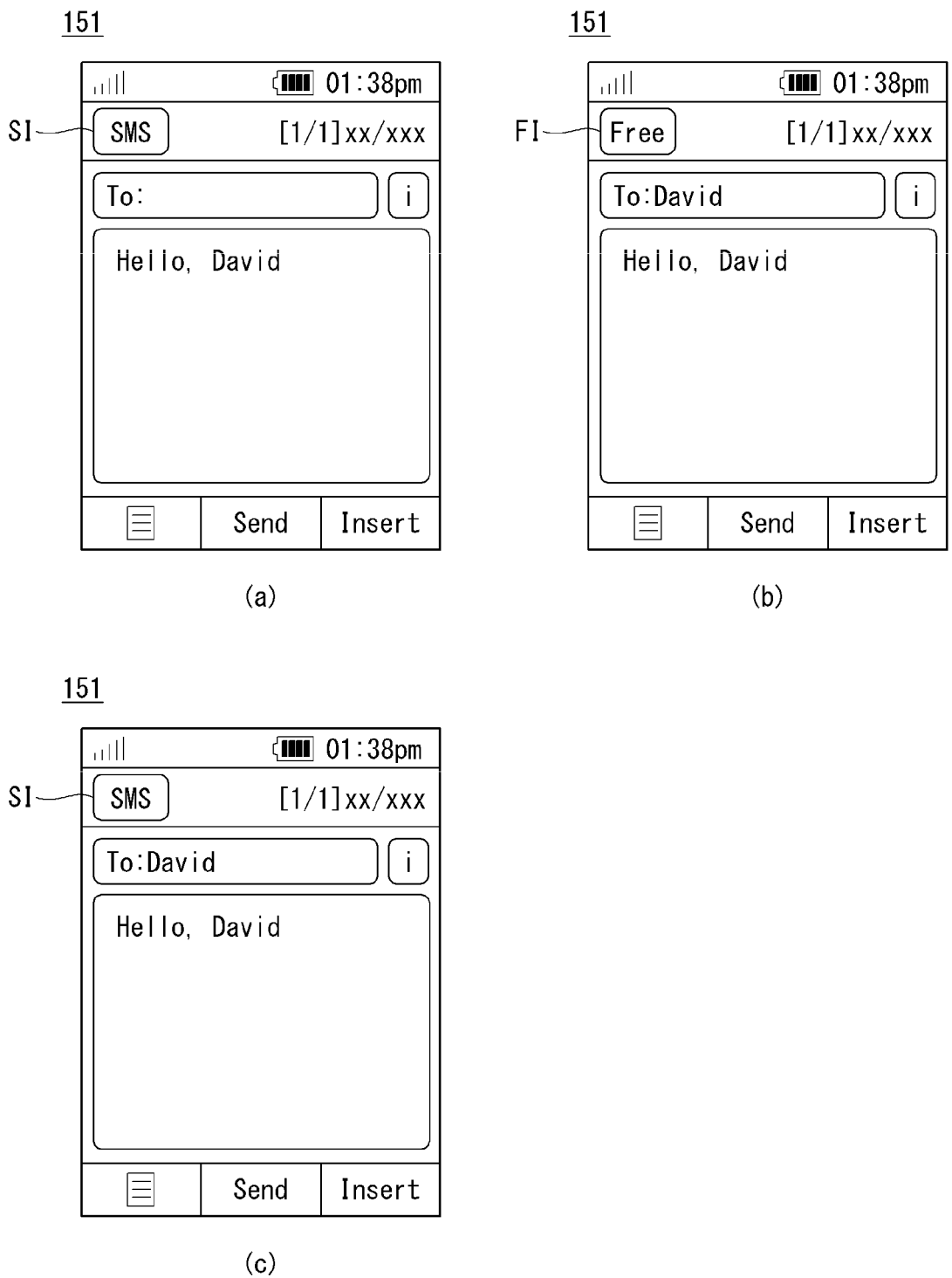
FIGS. 17(a)-(c) are diagrams illustrating a process of transmitting a message in the mobile terminal of FIG. 5.

FIG. 17 is a diagram illustrating a process of transmitting a message in the mobile terminal of FIG. 5.

As shown in FIG. 17, the controller 180 of the mobile terminal 100 according to an embodiment of the present invention controls to display in substantial real time whether communication with a specific user is charged.

As shown in FIG. 17A, when another party to transmit a message is not selected, it may be displayed through a first icon SI that a corresponding message is transmitted through a default means. In this case, the default means may be a means to charge according to the number of transmission of a message.

As shown in FIG. 17B, when another party to transmit a message is selected, a second icon FI corresponding to a communication means with the another party may be displayed. For example, when David is selected as another party and a free message is transmitted to David through a VoIP service, a second icon FI representing this may be displayed.

As shown in FIG. 17C, when a message cannot be transmitted free of charge to selected David, the controller 180 controls to display this through the first icon SI.

Figure 18:
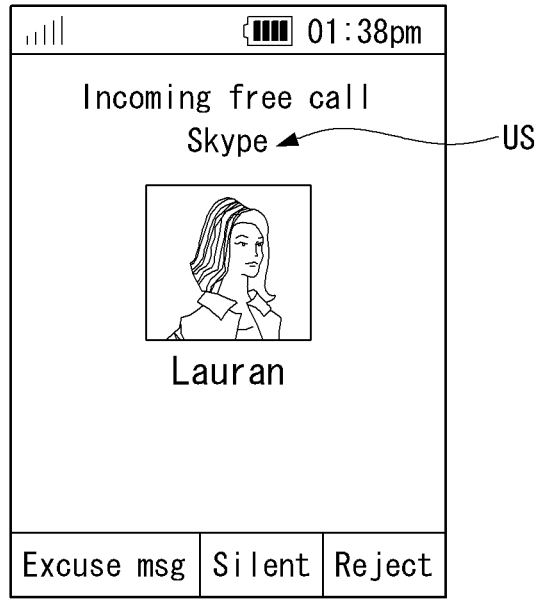
FIGS. 18(a)-(b) and 19(a)-(c) are diagrams illustrating a communication screen of the mobile terminal of FIG. 5.
Figure 18:
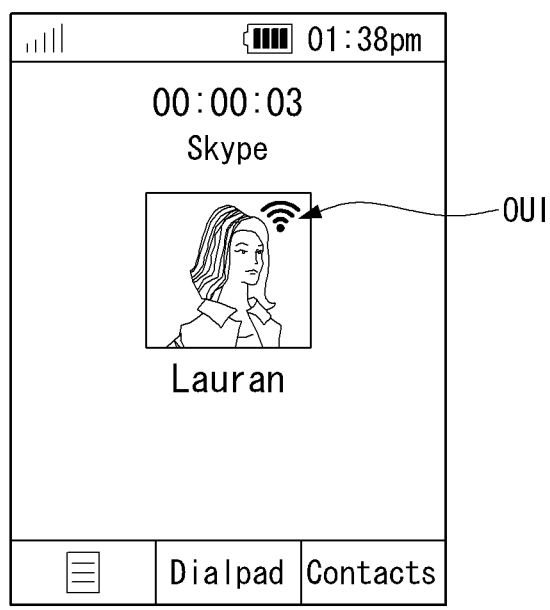
Figure 19:
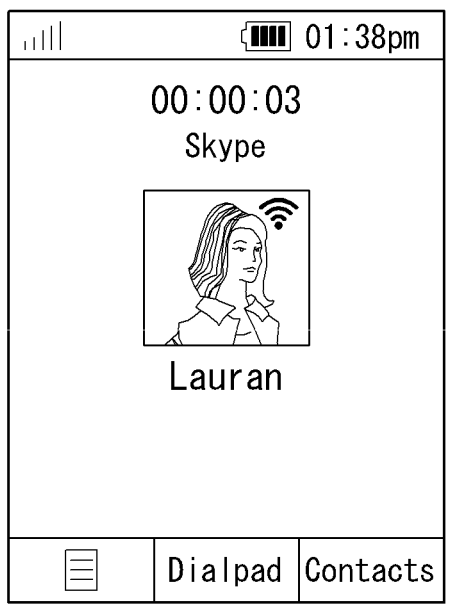
Figure 19:
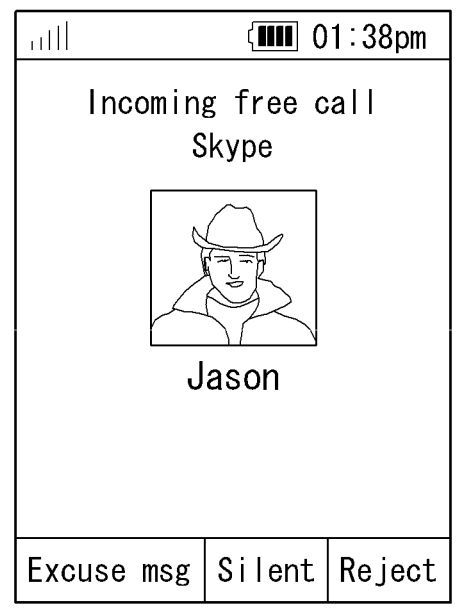
Figure 19:
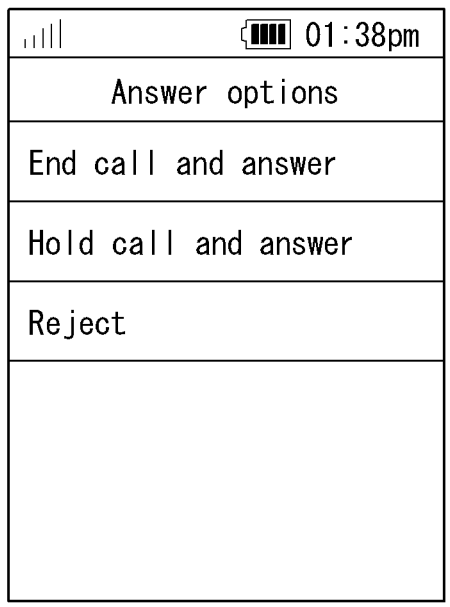

FIGS. 18 and 19 are diagrams illustrating a communication screen of the mobile terminal of FIG. 5.

As shown in FIGS. 18 and 19, the controller 180 of the mobile terminal 100 according to an embodiment of the present invention performs voice communication through a VoIP service.

As shown in FIG. 18A, when the user receives a call from another party, the controller 180 controls to display that the received call is a call through which VoIP service using an identification mark US.

As shown in FIG. 18B, while communication is being performed, the controller 180 controls to display a signal intensity icon OUI representing the another party's wireless Internet environment. The user of the mobile terminal 100 can easily recognize the another party's wireless Internet environment through the signal intensity icon OUI. Therefore, when the another party's wireless Internet environment is not good, communication can be performed through another means such as the mobile communication module 112.

As shown in FIG. 19A, communication with another party can be performed.

As shown in FIG. 19B, while communication is being performed with another party, a call may be received from the third party.

As shown in FIG. 19C, while communication is being performed with another party, when a call is received from the third party, a menu for processing the received call may be displayed.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display configured to display information; and
a controller configured to:
acquire and manage information about a plurality of voice over Internet protocol (VoIP) applications;
cause the display to display a first graphic user interface for performing a message transmission function when a specific recipient is specified, wherein the first graphic user interface allows transmission of a message to the specific recipient selectively via a default message application or a VoIP application among the plurality of VoIP applications based on availability of the default message application or the VoIP application with respect to the specific recipient;
set the VoIP application as a communication means with respect to the specific recipient when the message is transmittable to the specific recipient free of charge by the VoIP application; and
cause the display to display a second graphic user interface for performing a message display function when communicating messages with a specific party, wherein the second graphic user interface includes a message display area for displaying a plurality of messages communicated between the mobile terminal and the specific party, the plurality of messages including at least one first message communicated with the specific party via the default message application and at least one second message communicated with the specific party via at least one of the plurality of VoIP applications, the at least one first message and the at least one second message displayed distinguishably from each other,
wherein when the specific recipient is associated with at least a first VoIP application and a second VoIP application among the plurality of VoIP applications, and the message to be transmitted comprises a plurality of data including data of at least two different formats, the controller is further configured to:
divide the plurality of data into at least a first data group and a second data group according to data formats of the plurality of data;
match the first data croup to the first VoIP application and match the second data group to the second VoIP application based on charging schemes of the first and second VoIP applications;
cause transmission of the first data group to the specific recipient using the first VoIP application; and
cause transmission of the second data group to the specific recipient using the second VoIP application.

2. The mobile terminal of claim 1, wherein the controller is further configured to control the display to display an indicator indicating that the message is transmittable to the specific recipient free of charge in the first graphic user interface.

3. The mobile terminal of claim 1, wherein when a specific message is communicated with the specific party by a specific VoIP application, the controller is further configured to cause the display to display the specific message with an indicator representing the specific VoIP application in the second graphic user interface.

4. The mobile terminal of claim 1, wherein when a merge function for a specific contact item is activated, the controller is further configured to cause the display to display a third graphic user interface for merging information of at least one VoIP application associated with the specific contact item into the specific contact item.

5. The mobile terminal of claim 4, wherein the controller is further configured to:
search the information of the at least one VoIP application associated with the specific contact item; and
cause the display to display the searched information in a form of a selectable list in the third graphic user interface.

6. The mobile terminal of claim 1, wherein the first graphic user interface includes a first indicator indicating that a message will be sent to the specific recipient by the default message application when no VoIP application is available for transmission of the message to the specific recipient free of charge.

7. The mobile terminal of claim 6, wherein the first graphic user interface includes a second indicator indicating availability of the VoIP application when the VoIP application allows transmission of the message to the specific indicator free of charge.

8. A method of communicating a message at a mobile terminal, the method comprising:
acquiring and managing information about a plurality of voice over Internet protocol (VoIP) applications;
displaying a first graphic user interface for performing a message transmission function when a specific recipient is specified, wherein the first graphic user interface allows transmission of a message to the specific recipient selectively via a default message application or a VoIP application among the plurality of VoIP applications based on availability of the default message application or the VoIP application with respect to the specific recipient;
setting the VoIP application as a communication means with respect to the specific recipient when the message is transmittable to the specific recipient free of charge by the VoIP application; and
displaying a second graphic user interface for performing a message display function when communicating messages with a specific party, wherein the second graphic user interface includes a message display area for displaying a plurality of messages communicated between the mobile terminal and the specific party, the plurality of messages including at least one first message communicated with the specific party via the default message application and at least one second message communicated with the specific party via at least one of the plurality of VoIP applications, the at least one first message and the at least one second message displayed distinguishably from each other,
wherein when the specific recipient is associated with at least a first VoIP application and a second VoIP application among the plurality of VoIP applications, and the message to be transmitted comprises a plurality of data including data of at least two different formats, the method further comprises:
dividing the plurality of data into at least a first data group and a second data group according to data formats of the plurality of data;
matching the first data group to the first VoIP application and matching the second data group to the second VoIP application based on charging schemes of the first and second VoIP applications;
transmitting the first data group to the specific recipient using the first VoIP application; and
transmitting the second data group to the specific recipient using the second VoIP application.

9. The method of claim 8, further comprising displaying an indicator indicating that the message is transmittable to the specific recipient free of charge in the first graphic user interface.

10. The method of claim 8, wherein when a specific message is communicated with the specific party by a specific VoIP application, the method further comprises displaying the specific message with an indicator representing the specific VoIP application in the second graphic user interface.

11. The method of claim 8, wherein when a merge function for a specific contact item is activated, the method further comprises displaying a third graphic user interface for merging information of at least one VoIP application associated with the specific contact item into the specific contact item.

12. The method of claim 11, further comprising:
searching the information of the at least one VoIP application associated with the specific contact item; and
displaying the searched information in a form of a selectable list in the third graphic user interface.

13. The method of claim 8, wherein the first graphic user interface includes a first indicator indicating that a message will be sent to the specific recipient by the default message application when no VoIP application is available for transmission of the message to the specific recipient free of charge.

14. The method of claim 13, wherein the first graphic user interface includes a second indicator indicating availability of the VoIP application when the VoIP application allows transmission of the message to the specific indicator free of charge.

* * * * *